DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 5

T909,001

HEAT STABLE MICROENCAPSULATED FIRE EXTINGUISHING AGENTS

Robert L. Combs and Willis C. Wooten, Jr., both of P.O. Box 511, Kingsport, Tenn. 37662

Continuation of abandoned application Ser. No. 37,303, May 14, 1970. This application Jan. 28, 1972, Ser. No. 221,839

**Int. Cl. A62d *1/00***

U.S. Cl. 252—2

No Drawing. 17 Pages Specification

Heat stable microencapsulated fire extinguishing agents which, when dispersed in moldable or extrudable compositions, render such compositions and products produced therefrom self-extinguishing. These microencapsulated agents are particularly characterized in that the encapsulating wall is composed of a substance such as a silicate, a silicone, an epoxy resin, a fluorine-containing polymer, or the like which will not rupture and release the fire extinguishing agent at temperatures up to about 350° C. The microencapsulated fire extinguishing agents will not discolor, degrade, or form voids in the base polymer under normal processing conditions, and will not plug spinerette orifices when compositions containing them are employed in melt or solution spinning.